(12) United States Patent
Flügge et al.

(10) Patent No.: US 8,998,090 B1
(45) Date of Patent: Apr. 7, 2015

(54) STANDOFF FOR OPTICAL IMAGING SYSTEM

(71) Applicants: Kai Flügge, Aachen (DE); Laurens Nunnink, Simpelveld (NL); James A. Negro, Arlington, MA (US)

(72) Inventors: Kai Flügge, Aachen (DE); Laurens Nunnink, Simpelveld (NL); James A. Negro, Arlington, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 13/832,762

(22) Filed: Mar. 15, 2013

(51) Int. Cl.
*G06K 7/10* (2006.01)
*G06K 7/14* (2006.01)
*F21V 8/00* (2006.01)

(52) U.S. Cl.
CPC ............... *G06K 7/14* (2013.01); *G02B 6/0096* (2013.01)

(58) Field of Classification Search
CPC ....... G06K 7/10; G06K 7/10821; G02B 5/09; G02B 21/24
USPC ............................................ 235/454, 472.01
See application file for complete search history.

(56) References Cited

U.S. PATENT DOCUMENTS

| | | | |
|---|---|---|---|
| 4,210,802 A | 7/1980 | Sakai | |
| 4,222,654 A | 9/1980 | Bodenhamer | |
| 4,288,690 A | 9/1981 | Sanner | |
| 5,191,199 A | 3/1993 | Elko | |
| 5,285,056 A | 2/1994 | Tedesco et al. | |
| 5,408,084 A * | 4/1995 | Brandorff et al. | 250/208.1 |
| 5,486,944 A | 1/1996 | Bard et al. | |
| 5,569,902 A | 10/1996 | Wood et al. | |
| 5,656,803 A | 8/1997 | Seo | |
| 5,786,586 A * | 7/1998 | Pidhirny et al. | 235/472.01 |
| 6,000,612 A | 12/1999 | Xu | |
| 6,045,047 A | 4/2000 | Pidhirny et al. | |
| 6,246,925 B1 | 6/2001 | Robinson et al. | |
| 7,194,200 B1 | 3/2007 | Behlow | |
| 7,370,801 B2 * | 5/2008 | Hattersley et al. | 235/462.43 |
| 7,570,816 B2 | 8/2009 | Bargeron et al. | |
| 7,600,687 B2 | 10/2009 | Biss et al. | |
| 7,604,174 B2 * | 10/2009 | Gerst et al. | 235/462.32 |
| 8,014,604 B2 | 9/2011 | Tzadok et al. | |
| 8,027,802 B1 * | 9/2011 | Nadabar et al. | 702/150 |
| 8,081,849 B2 | 12/2011 | King et al. | |
| 8,251,279 B2 | 8/2012 | Lyon et al. | |
| 2006/0249581 A1 * | 11/2006 | Smith | 235/454 |
| 2008/0260210 A1 | 10/2008 | Kobeli et al. | |
| 2011/0128373 A1 | 6/2011 | Goldberg | |
| 2012/0281087 A1 | 11/2012 | Kruse | |

OTHER PUBLICATIONS

Brennan, Elaine and Allean Renear. "New Communication Media; Scanning." Humanist Discussion Group, vol. 3, No. 1337. May 1, 1990.

* cited by examiner

*Primary Examiner* — Seung Lee
(74) *Attorney, Agent, or Firm* — Quarles & Brady LLP (57) ABSTRACT

A standoff for an optical imaging system includes a base, with a target plate coupled to the base and positioned along a central trajectory of the base. The target plate includes a scan window positioned along the central trajectory of the base. The scan window serves to align the optical imaging system with an optical mark on an object. A machine readable code can be positioned on the target plate, the machine readable code including optical imaging system setting information to be read by the optical imaging system.

23 Claims, 6 Drawing Sheets

STANDOFF FOR OPTICAL IMAGING SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE TECHNOLOGY

The present technology relates to optical imaging systems, and more specifically, to a standoff accessory for optical imaging systems.

One of the most common imaging systems is the handheld scanner typically used for reading fonts or other symbols or marks on packages or articles, for example. It is important for imaging systems to achieve a quality scan so the image can be electronically searched, stored more compactly, displayed on-line, and used in a variety of machine related processes, including machine translation, text-to-speech and text mining applications.

With a handheld scanner, it can be necessary to position the scanner where the mark is at the right distance and the right angle in front of the scanner, all while providing adequate illumination, in order to achieve a successful scan. This is because in most imaging systems, the size of the image of a mark depends on the distance between the vision sensor and the object containing the mark. Therefore, in applications requiring gauging a size, it can be necessary to have the object at a known distance.

When illumination has been integrated into the imaging system, and more particularly the handheld scanner, the light distribution on the object usually varies with the distance between the object and the vision sensor in the handheld scanner. Proper light distribution is especially important in applications such as reading dot-peen 2D codes with low-angle illumination or verification of direct part marking (DPM) codes, for example.

Especially in handheld scanner applications, it can be difficult to keep the handheld scanner at a proper focal distance where the depth of field is very small, such as when a mark is very small or includes low contrast. As with any imaging device, providing quality results for each image scan can be difficult taking into consideration the numerous variables that affect the quality of an image scan.

What is needed are systems and methods that can improve the quality of results for each image scan by influencing the variables that affect the quality of an image scan.

BRIEF SUMMARY OF THE TECHNOLOGY

The present embodiments overcomes the disadvantages of the prior art by providing a standoff that can be coupled to an imaging system and improve the quality of results for each image scan by influencing the variables that affect the quality of an image scan and/or a decode process.

Accordingly, some embodiments comprise a standoff. The standoff includes a base, the base being operable to couple to an optical imaging system. At least one spacer coupled to the base, the at least one spacer having an adjustable length, the adjustable length determining a distance to a target object. An illumination guide is coupled to the base, the illumination guide positioned along a central trajectory of the base.

Other embodiments comprise a standoff for an optical imaging system. The standoff includes a base, where the base is operable to couple to the optical imaging system. At least one spacer is coupled to the base, the at least one spacer having an adjustable length, the adjustable length determining a distance to a target object. A target plate is coupled to the at least one spacer and positioned along a central trajectory of the base, the target plate having features to align the optical imaging system with an optical mark on the target object.

Yet additional embodiments comprise a standoff for an optical imaging system. The standoff includes a base having a central trajectory, the base being operable to couple to the optical imaging system. At least one spacer is coupled to the base, the at least one spacer having a length, the length determines a distance to a target object. An illumination guide is coupled to the base, the illumination guide positioned along the central trajectory of the base. A target plate is coupled to the at least one spacer and positioned along the central trajectory of the base, the target plate to align the optical imaging system with an optical mark on an object. A machine readable code is positioned on the target plate, the machine readable code including optical imaging system setting information to be read by the optical imaging system.

Other embodiments comprise a method for scanning a mark on an object. The method can include the steps of providing a standoff, the standoff including a base and at least one spacer coupled to the base, the at least one spacer having an adjustable length, the adjustable length determining a distance to a target object; coupling the standoff to an optical imaging system; positioning the standoff so the at least one spacer touches or is substantially near the target object; and enabling a scan of an optical mark on the target object.

To the accomplishment of the foregoing and related ends, the technology, then, comprises the features hereinafter fully described. The following description and the annexed drawings set forth in detail certain illustrative aspects of the technology. However, these aspects are indicative of but a few of the various ways in which the principles of the technology can be employed. Other aspects, advantages and novel features of the technology will become apparent from the following detailed description of the technology when considered in conjunction with the drawings.

While the technology is susceptible to various modifications and alternative forms, specific embodiments thereof have been shown by way of example in the drawings and are herein described in detail. It should be understood, however, that the description herein of specific embodiments is not intended to limit the technology to the particular forms disclosed, but on the contrary, the intention is to cover all modifications, equivalents, and alternatives falling within the spirit and scope of the technology as defined by the appended claims.

DETAILED DESCRIPTION OF THE TECHNOLOGY

The various aspects of the subject technology are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system," "device" and the like are intended to refer to either hardware, a combination of hardware and software, software, or software in execution. The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques and/or programming to produce hardware, firmware, software, or any combination thereof to control an electronic based device to implement aspects detailed herein.

Unless specified or limited otherwise, the terms "connected," and "coupled" and variations thereof are used broadly and encompass both direct and indirect mountings, connections, supports, and couplings. Further, "connected" and "coupled" are not restricted to physical or mechanical connections or couplings. As used herein, unless expressly stated otherwise, "connected" means that one element/feature is directly or indirectly connected to another element/feature, and not necessarily electrically or mechanically. Likewise, unless expressly stated otherwise, "coupled" means that one element/feature is directly or indirectly coupled to another element/feature, and not necessarily electrically or mechanically.

As used herein, the term "processor" may include one or more processors and memories and/or one or more programmable hardware elements. As used herein, the term "processor" is intended to include any of types of processors, CPUs, microcontrollers, digital signal processors, or other devices capable of executing software instructions.

As used herein, the term "memory medium" includes a non-volatile medium, e.g., a magnetic media or hard disk, optical storage, or flash memory; a volatile medium, such as system memory, e.g., random access memory (RAM) such as DRAM, SRAM, EDO RAM, RAMBUS RAM, DR DRAM, etc.; or an installation medium, such as software media, e.g., a CD-ROM, or floppy disks, on which programs may be stored and/or data communications may be buffered. The term "memory medium" may also include other types of memory or combinations thereof.

Embodiments of the technology are described below by using diagrams to illustrate either the structure or processing of embodiments used to implement the embodiments of the present technology. Using the diagrams in this manner to present embodiments of the technology should not be construed as limiting of its scope. The present technology contemplates a standoff device for an optical imaging system.

The various embodiments of a standoff device will be described in connection with a handheld scanner, the scanner adapted to acquire an image of a mark. That is because the features and advantages of the technology are well suited for this purpose. Still, it should be appreciated that the various aspects of the technology can be applied in other forms of imaging systems, including fixed mount imaging systems that may benefit from a standoff device having the features described herein.

Figure 1:
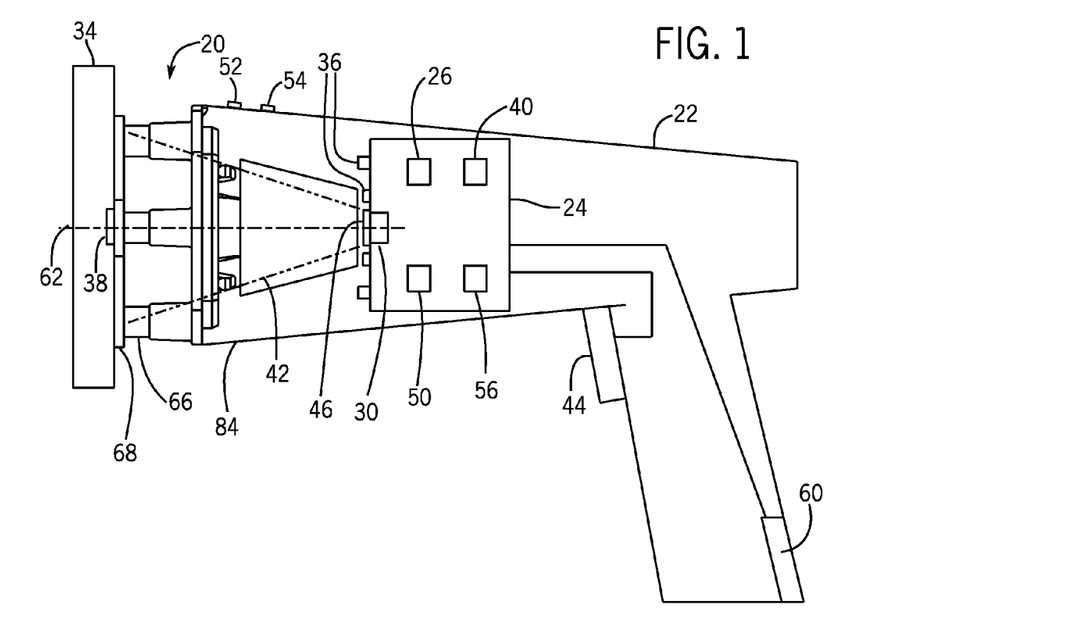
FIG. 1 is a schematic side view of one embodiment of a standoff device accordance with the present embodiments, and showing the standoff coupled to a handheld scanner.
Figure 2:
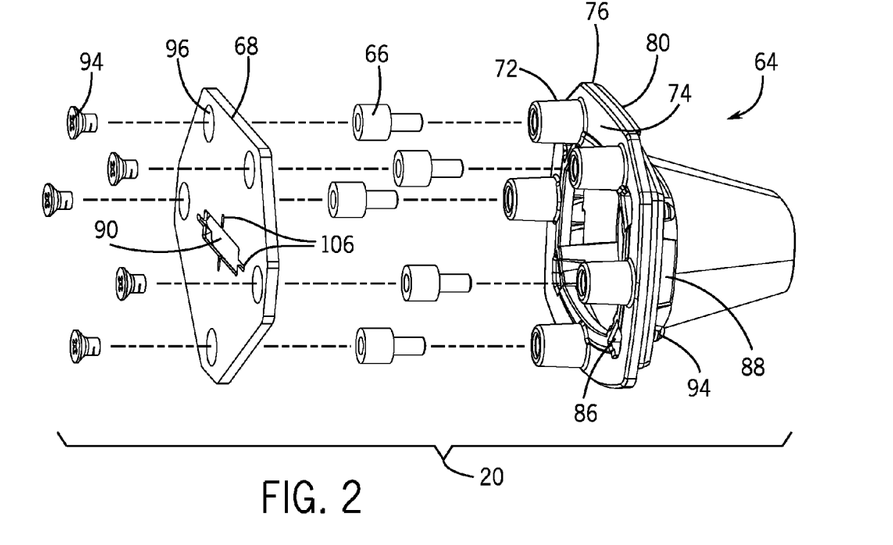
FIG. 2 is an exploded view of an embodiment of the standoff device as seen in FIG. 1.
Figure 3:
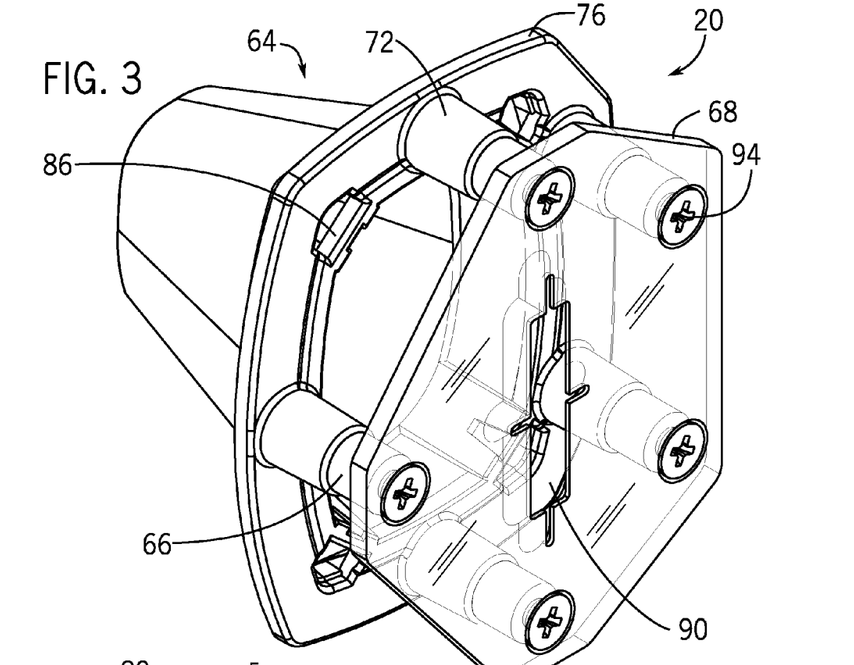
FIG. 3 is a front perspective view of an embodiment of the standoff device as seen in FIG. 1.

Referring now to FIG. 1, an exemplary embodiment of a standoff device 20 will be described in the context of use with a handheld scanner 22. Various configurations of scanners 22 without a standoff device 20 are well known. It is to be appreciated that the standoff device 20 described herein can be adapted to integrate with most handheld and fixed mount optical imaging systems. The exemplary standoff 20 and handheld scanner 22 can be used in a warehousing, manufacturing, assembly, automation, and/or control application, among others, as non-limiting examples. The scanner 22 can use image acquisition software 26 operable to perform any of various types of image acquisitions. The scanner 22 can perform machine vision tasks including scanning and decoding images containing any variety of bar codes, fonts and/or symbols, as non-limiting examples.

Referring still to FIG. 1, the scanner 22 can include a scanner subassembly 24. The scanner subassembly 24 can include a variety of components that can be used in the scanning process and are generally associated with image acquisition. For example, the scanner subassembly 24 can include a vision sensor 30. The vision sensor 30 serves to convert reflected light from an object 34 and associated mark 38 on the object into electrons to create an electronic image 40 of the mark 38 in the field of view (FOV) 42 when a trigger 44 is pulled or released. Controllable illumination can be provided from one or a plurality of illumination sources 36 that can provide illumination in the FOV 42. In some embodiments, a lens assembly 46 can be positioned over or in front of the vision sensor 30 to provide a view of the object 34 in the FOV 42 to the vision sensor 30.

Scanner subassembly 24 can also include a processor 50 used for image processing and decoding, for example. The processor 50 is coupled to the vision sensor 30, and can either be part of the vision sensor 30, or it can be locally linked to the vision sensor 30. The processor 50 can be encoded with the image acquisition software 26 that can be configured to, among other things, control illumination, acquire image data, and process/decode the acquired image data into usable information.

Processor 50 can also be coupled to one or more visual feedback devices 52 and/or one or more audio feedback devices 54 to provide feedback to a user indicating the results of the scan and/or decode process (e.g., whether or not the quality of the imaged mark meets or exceeds a baseline quality assessment value). For example, visual feedback devices 52 may include lights or light emitting diodes and the audio feedback device 54 may include a small speaker or beeper device. In at least some cases, different LED colors may be used to indicate whether or not the mark quality passes the baseline value test (e.g., a green LED may indicate high mark quality while a red LED indicates a mark that failed a quality test).

Scanner subassembly 24 can also include a memory medium 56 coupled to the vision sensor 30 and/or the processor 50. The memory medium can be used for storing scanned or processed images 40, buffering data and communications, and the like. A communication port 60 can also be coupled to the scanner subassembly 24, and provide a connection point to an optional computer (not shown). It is to be appreciated that wireless communications are also contemplated.

Referring to FIGS. 1-4, in the embodiments shown, the standoff 20 can be a generally rigid member that extends along a trajectory that is substantially parallel to a central trajectory 62 of the FOV 42. The standoff 20 can be a combination of molded or formed or cast elements, and can include a base 64, a plurality of spacers 66 coupled to the base 64, and a target plate 68 coupled to the spacers 66. In some embodiments, the base 64 includes a plurality of connectors 72 positioned on or in or extending from a first side 74 of a support 76.

Figure 5:
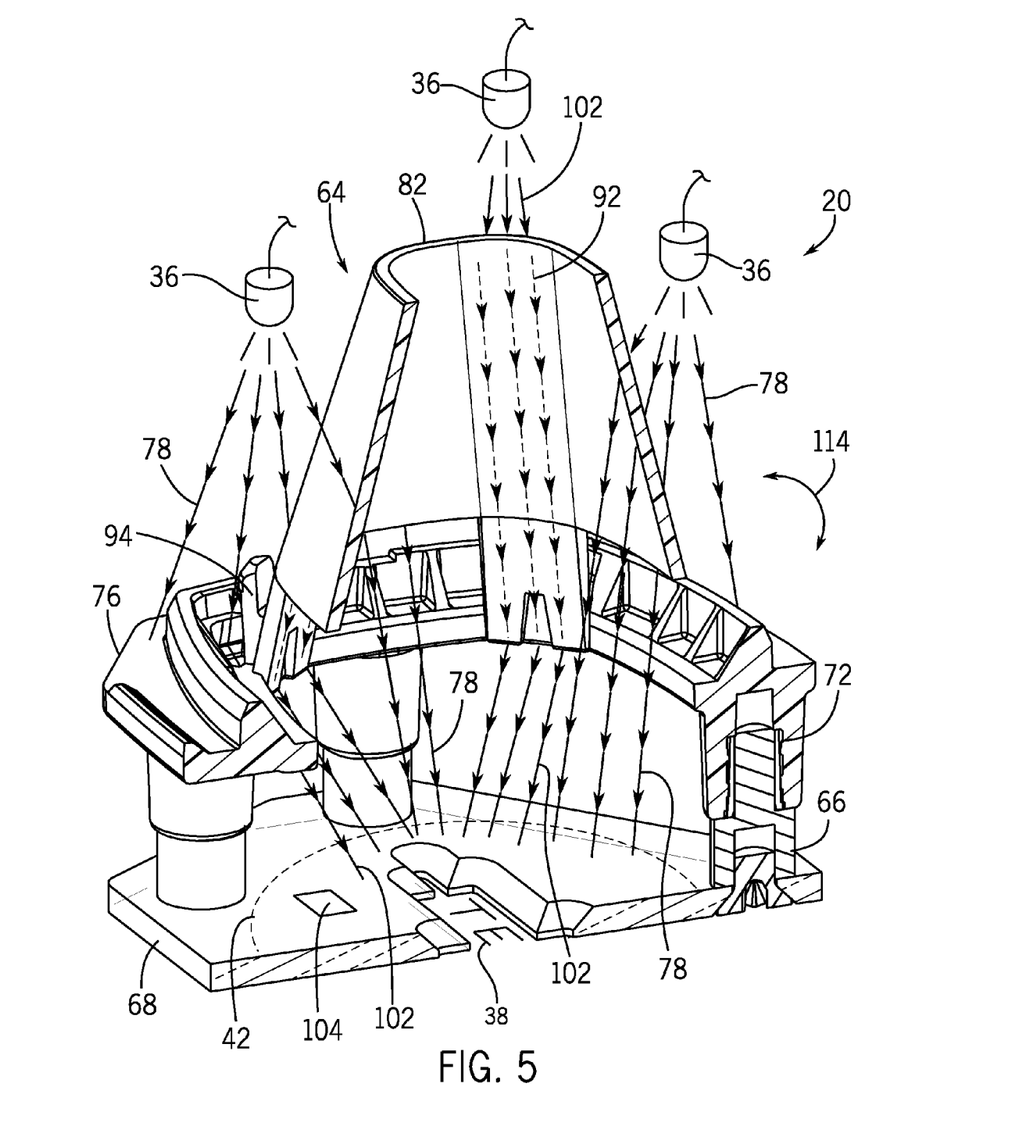
FIG. 5 is a cross sectional view taken along line 5-5 in FIG. 4.

Referring to FIG. 5, one or a combination of the base 64, the plurality of spacers 66, and the target plate 68 can function to change characteristics of and/or change the shape of illumination coming from the illumination sources 36. In some embodiments, one or a combination of the base 64, the plurality of spacers 66, and the target plate 68 can be made of a translucent material to provide a more diffuse illumination on the mark 38, thereby taking advantage of lighting options available with the scanner 22. The illumination 78 from the illumination sources 36 can pass through the translucent material and provide additional diffuse illumination benefits to improve the quality of the results from a scan.

Figure 4:
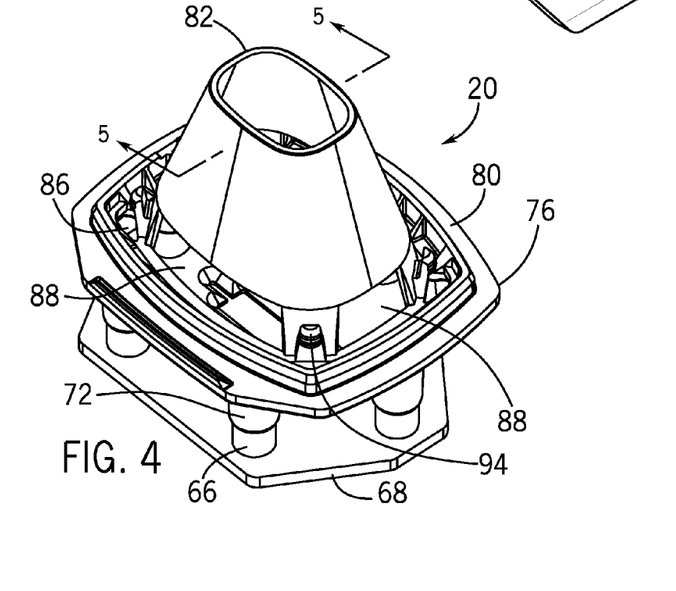
FIG. 4 is a rear perspective view of an embodiment of the standoff device as seen in FIG. 1.

In other embodiments, one or a combination of the base 64, the plurality of spacers 66, and the target plate 68 can be made of an opaque material, and can include one or more apertures, e.g., a window or transparent area that can be configured to transmit only a predetermined portion of the illumination 78 coming from the illumination sources 36 through the aperture substantially unaffected. FIGS. 4 and 5, for example, shows a window 86 and a window 88 in the base 64. Illumination 78 from the illumination source 36 can pass through one or more windows 86, 88 to provide illumination for a scan. The target plate 68 can include a scan window 90, which will be described in greater detail below.

In some embodiments, the base 64 can include a frustoconical shaped illumination guide 82 can extend from a second side 80 of the support 76. All or portions of the illumination guide 82 can serve as a light pipe to direct illumination to the FOV 42. As seen in FIG. 5, light pipe 92 can receive illumination 102 from illumination source 36 and direct the illumination 102 to the FOV 42 as low angle bright field illumination and/or as high angle dark field illumination.

Figure 6:
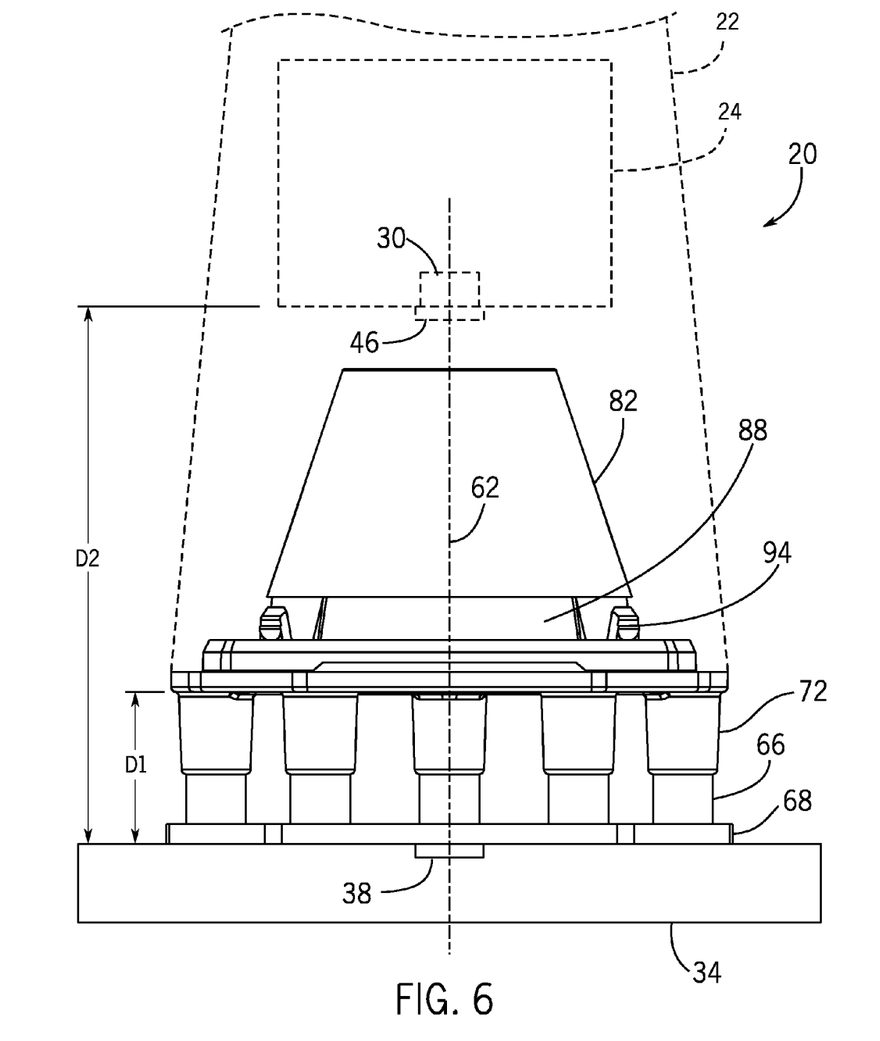
FIG. 6 is a side view of an embodiment of the standoff device as seen in FIG. 1.
Figures 7, 8, 9:
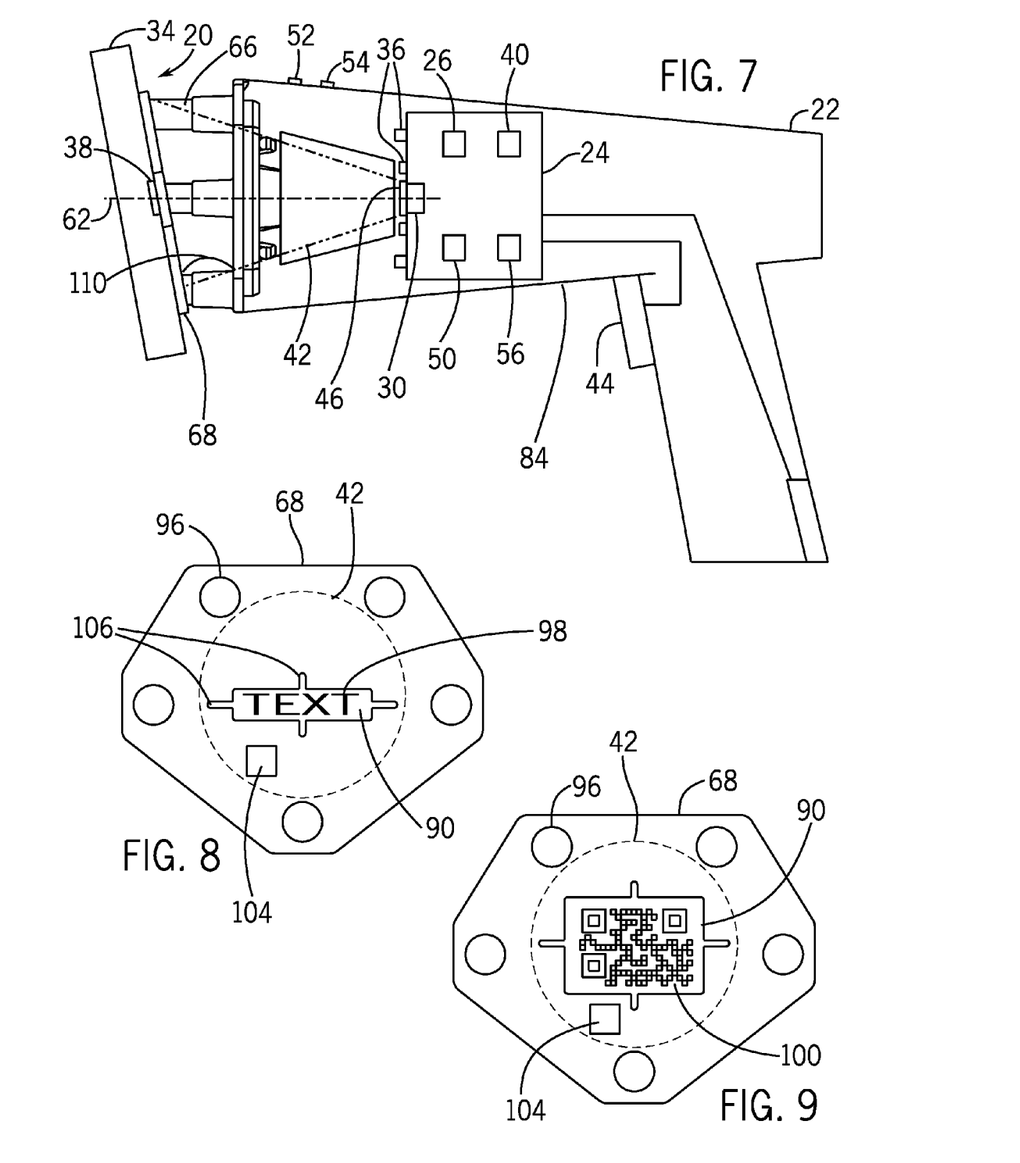
FIG. 7 is a schematic side view of an alternative embodiment of a standoff device, the standoff device being positioned at a predetermined angle.
FIGS. 8 and 9 are plan views of alternative embodiments of a target plate.

Referring to FIGS. 6 and 7, the standoff 20 can snap or otherwise couple to a front portion 84 of the scanner 22 by way of one or more clips or tabs 94 or the like that couple to the scanner 22. While the standoff 20 is shown as generally rigid and removably coupled to the scanner 22, in some embodiments, the standoff 20 can be somewhat flexible.

The spacers 66 are used to couple the base 64 to the target plate 68. The spacers 66 provide a predetermined distance D1 between the support 76 of the base 64 and the mark 38, and ultimately a predetermined working distance D2 between the vision sensor 30 and the mark 38. Accordingly, the spacers 66 can be adjustable in length, and they can also come in a variety of predetermined lengths for various applications. In some embodiments, the spacers 66 can be telescoping, e.g., like a radio antenna, to provide flexibility without the need to replace the spacers 66 for each particular application.

In the embodiments shown, a spacer 66 can be screwed or press fit, for example, into a connector 72 for ease of placement and removal. In other embodiments, the connectors 72 can be eliminated and a connector in the support 76, as compared to on the support 76, can be used to couple the spacers 66 to the base. The target plate 68 can be coupled to the spacers 66 and ultimately the base 64 using screws 94 and apertures 96 or other well known attachment methods. In some embodiments, the spacers 66 can be integral with the target plate 68 such that the target plate 68 and associated spacers 66 can be press fit to the base 64. It is to be appreciated that the spacers and/or target plate can be releasably coupled to the base in a variety of ways and are contemplated in the current embodiments.

Referring to FIG. 7, some embodiments of standoff 20 can include the target plate 68 at a predetermined angle 110 to align the mark in the FOV 42 at the predetermined angle. Spacers 66 can be sized accordingly to provide the predetermined angle 110 between the support 76 and the target plate 68.

In other embodiments, the support 76 or other portions of the standoff 20 can be rotatable 114 to allow the position of the predetermined angle 110 to move for a particular application, or to allow the scan window 90 in the target plate 68 to be repositioned for a particular application.

The standoff 20 can serve to improve the quality of the results from a mark scan attempt. When using a traditional handheld scanner, uncertainty is inherently introduced in a mark scan by the physical position of the object 34 and associated mark 38 in relation to the imaging device, e.g., the scanner 22. The standoff 20 can serve to offer improvement and consistency in the Z position or predetermined working distance D2 between the mark 38 and the vision sensor 30 to provide optimal working distance and scale. Results of a scan can be improved provided the vision sensor 30 is the predetermined working distance D2 from the mark 38 to be scanned so that the image is generally in focus without requiring the processor 50 to perform extensive calculations in an attempt to improve the focus of the mark 38. The optimal predetermined working distance D2 is important to determine the scale of the mark 38 in the image and to insure a sufficient focus. In other embodiments, lens assembly 46 can be a constant focus or "zoom" lens assembly 46 that can be used to provide constant magnification for a wide range of working distances when spacers 66 with different lengths are used.

Referring to FIGS. 8 and 9, the target plate 68 can be a machined or molded component, and can be transparent or translucent or opaque, as described above, or any combination. The target plate can include the scan window 90. The scan window 90 can be used to align the scanner 22 with the mark 38 or features of the mark. FIG. 8 shows a rectangular scan window 90 aligned with a line of text for an optical character recognition (OCR) scan. FIG. 9 shows a square scan window 90 aligned with a two-dimensional bar code symbol. It is to be appreciated that any shaped scan window 90 is contemplated. Accordingly, the scan window 90 can also offer improvement and consistency in the X-Y position of one or both of the scanner 22 and the mark 38.

In some embodiments, the target plate 68 can be shaped or include a contour or features that mate with the object 34 or mark 38 to be scanned. In the embodiment shown, the target plate is generally flat to mate with a flat object 34. As described above, the target plate 68 can be positioned at an angle 110 to mate with an object 34 on an angle. As another example, target plate 68 can be rounded or curved to mate with a rounded or curved object 34.

In other embodiments, the target plate 68 can include a fiducial marker such as a machine readable mark 104. The machine readable mark 104 can put the scanner 22 in a scan mode that can be optimized for the particular application and/or standoff 20 coupled to the scanner 22. For example, the machine readable mark 104 can provide depth of field information to the scanner 22 when the target plate 68 is integrated with spacers 66 having a predetermined distance D1. Yet in other embodiments, the target plate 68 can include a pattern 106 that can be used by the scanner 22 to optimize the focus at the D1 distance, for example.

In some embodiments, the target plate 68 can be eliminated. In these embodiments, the spacers 66 could contact the object 34 with the working distance D2 still being the distance between the mark 38 and the vision sensor 30.

In some embodiments, the mark 38 can remain visible to a user that may be looking at the mark 38 on the object 34. In other embodiments, the standoff 20 can partially or substantially reduce the user's ability to visualize the actual mark 38 on the object 34. In some embodiments, the visual feedback device 52 and/or the audio feedback device 54 can be used to provide feedback to a user indicating a position of the mark 38, e.g., the mark is partially or completely within the scan window 90.

Figure 10:
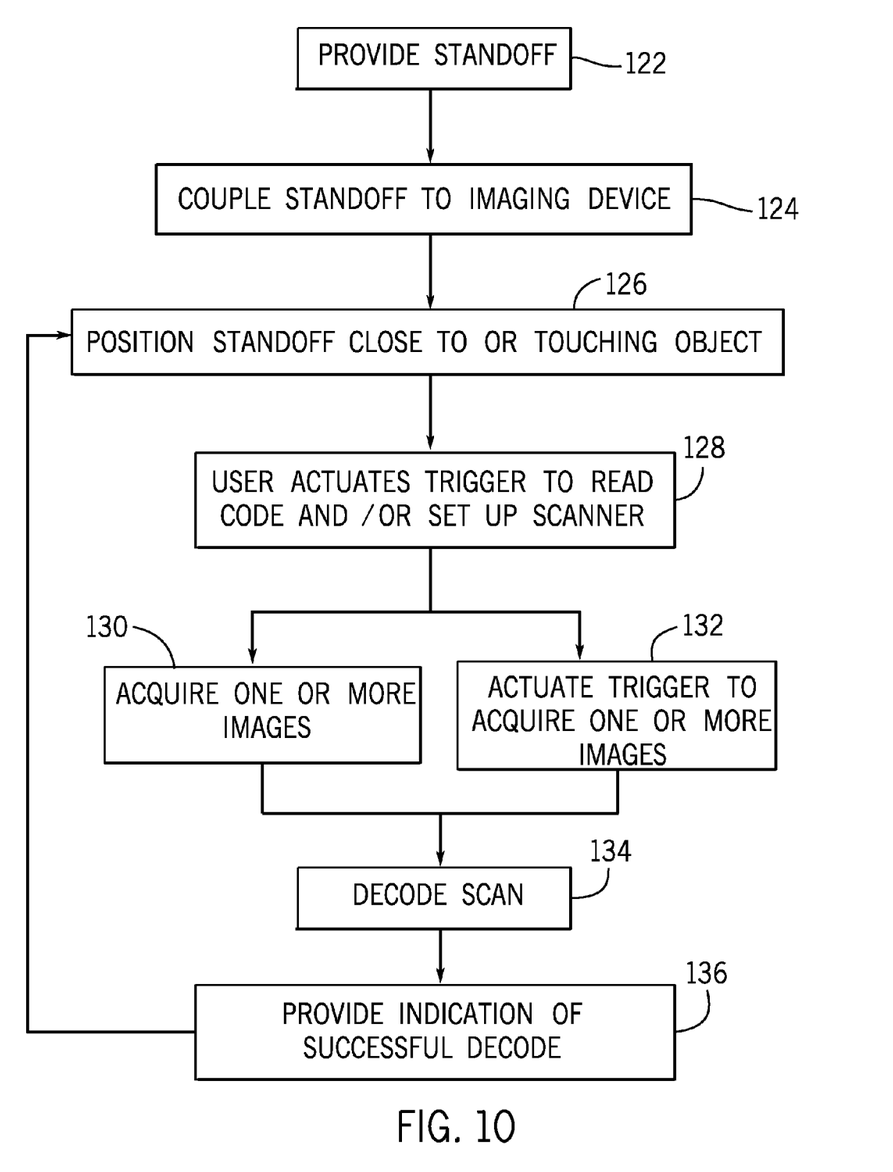
FIG. 10 is a flow chart of a method associated with the standoff device handheld scanner in accordance with the present embodiments.

FIG. 10 illustrates an embodiment of a method for use of a standoff 20. The method shown in FIG. 10 may be used in conjunction with any of the systems or devices shown in the above Figures, among others. In various embodiments, some of the method elements shown may be performed concurrently, in a different order than shown, or may be omitted. Additional method elements may also be performed as desired.

Referring to FIG. 10, a method 120 is shown for scanning a mark 38 on an object 34. A first step can be to provide a standoff 20, as indicated at process block 122. The standoff 20 would then be coupled to an imaging device, in this embodiment, a handheld scanner 22, as indicated at process block 124. Next, at process block 126, a user would position the standoff 20, coupled to the scanner 22, close to or touching the object 34 and associated mark 38 to be scanned. At process block 128, the user can then engage or release the trigger 44 to allow the image sensor 30 to scan and decode the machine readable mark 104 to put the scanner 22 in a scan mode that can be optimized for the particular application and/or standoff 20 coupled to the scanner 22. In some embodiments, the user can then activate the trigger 44 again to allow the scanner 22 to acquire one or more images of the mark 38, as indicated at process block 130. Or alternatively, the scanner 22 can attempt to acquire one or images after scanning and decoding the machine readable mark 104, as indicated at process block 132.

Optionally, at process block 134, the processor 50 can then decode the scan. Optionally, as indicated at process block 136, the scanner 22 can provide an indication of a successful image scan and/or decode by enabling one or more feedback devices 52, 54, and/or by providing other indications to the user. The process can then be repeated for the next mark to be scanned.

Although the present technology has been described with reference to preferred embodiments, workers skilled in the art will recognize that changes may be made in form and detail without departing from the spirit and scope of the technology. For example, the present technology is not limited to the standoff coupled to a handheld scanner as shown herein and may be practiced with other optical imaging systems.

The particular embodiments disclosed above are illustrative only, as the technology may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the technology. Accordingly, the protection sought herein is as set forth in the claims below.

What is claimed is:

1. A standoff comprising:
    a base, the base operable to couple to an optical imaging system;
    at least one spacer coupled to the base, the at least one spacer having an adjustable length, the adjustable length determining a distance to a target object; and
    an illumination guide coupled to the base, the illumination guide positioned along a central trajectory of the base.

2. The standoff according to claim 1, wherein the illumination guide includes a translucent material, the translucent material to diffuse at least a portion of illumination from the optical imaging system that is directed toward the base.

3. The standoff according to claim 1, wherein the illumination guide includes a opaque material, the opaque material to block at least a portion of illumination from the optical imaging system that is directed toward the base.

4. The standoff according to claim 1, further including a target plate coupled to the at least one spacer and positioned along the central trajectory of the base, the target plate having features to align the optical imaging system with an optical mark on the target object.

5. The standoff according to claim 4, wherein the target plate further includes a machine readable code positioned on the target plate, the machine readable code including optical imaging system setting information to be read by the optical imaging system.

6. The standoff according to claim 5, wherein the optical imaging system setting information includes working distance information, the working distance information includes an optimized focal distance.

7. A standoff for an optical imaging system, the standoff comprising:
    a base, the base operable to couple to the optical imaging system;
    at least one spacer coupled to the base, the at least one spacer having an adjustable length, the adjustable length determining a distance to a target object; and
    a target plate coupled to the at least one spacer and positioned along a central trajectory of the base, the target plate having features to align the optical imaging system with an optical mark on the target object.

8. The standoff according to claim 7, wherein the target plate further includes a scan window positioned along the central trajectory of the base.

9. The standoff according to claim 7, wherein the base further includes an illumination guide, the illumination guide positioned along the central trajectory of the base.

10. The standoff according to claim 7, wherein the target plate further includes a machine readable code positioned on the target plate, the machine readable code including application setting information to be read by the optical imaging system.

11. A standoff for an optical imaging system, the standoff comprising:

a base having a central trajectory, the base operable to couple to the optical imaging system;

at least one spacer coupled to the base, the at least one spacer having a length, the length determines a distance to a target object;

an illumination guide coupled to the base, the illumination guide positioned along the central trajectory of the base;

a target plate coupled to the at least one spacer and positioned along the central trajectory of the base, the target plate to align the optical imaging system with an optical mark on an object; and a machine readable code positioned on the target plate, the machine readable code including optical imaging system setting information to be read by the optical imaging system.

12. The standoff according to claim 11, wherein the length of the at least one spacer is adjustable.

13. The standoff according to claim 11, the base further including at least one aperture to allow illumination that is directed toward the base from the optical imaging system to pass through the aperture substantially unaffected.

14. The standoff according to claim 11, wherein the base further includes at least one light pipe, the at least one light pipe configured to provide at least one of a bright field illumination and a dark field illumination to illuminate the optical mark on the object.

15. The standoff according to claim 11, further including a handheld optical imaging system coupled to the standoff.

16. The standoff according to claim 15, wherein the target plate further includes a scan window positioned along the central trajectory of the base, and wherein the scan window enables a user to position the handheld optical imaging system for optimal X-Y position of the handheld optical imaging system to scan the optical mark on the object.

17. The standoff according to claim 11, wherein the at least one spacer provides a predetermined distance between the target plate and the base.

18. The standoff according to claim 11, wherein the at least one spacer is integral with the target plate.

19. A method for scanning a mark on an object, the method comprising:

providing a standoff, the standoff including a base and at least one spacer coupled to the base, the at least one spacer having an adjustable length, the adjustable length determining a distance to a target object;

coupling the standoff to an optical imaging system;

positioning the standoff so the at least one spacer touches or is substantially near the target object; and enabling a scan of an optical mark on the target object.

20. The method according to claim 19, further including adjusting the adjustable length of the at least one spacer to provide an optimal working distance to the target object.

21. The method according to claim 19, wherein the standoff further includes a target plate coupled to the at least one spacer, the target plate to align the optical imaging system with the optical mark on the object.

22. The method according to claim 21, wherein the target plate further includes a machine readable code positioned on the target plate, the machine readable code including application setting information to be read by the optical imaging system.

23. The method according to claim 22, further including the optical imaging system reading the machine readable code positioned on the target plate; and the optical imaging system adjusting an optical imaging system setting based on the application setting information.

* * * * *